US012785745B2

(12) United States Patent
Dose

(10) Patent No.: US 12,785,745 B2
(45) Date of Patent: Nov. 3, 2026

(54) DEVICE FOR SECURING A PHONE

(71) Applicant: Hans Dose, Solana Beach, CA (US)

(72) Inventor: Hans Dose, Solana Beach, CA (US)

( * ) Notice: Subject to any disclaimer, the term of this patent is extended or adjusted under 35 U.S.C. 154(b) by 275 days.

(21) Appl. No.: 18/661,639

(22) Filed: May 12, 2024

(65) Prior Publication Data

US 2024/0380427 A1 Nov. 14, 2024

Related U.S. Application Data

(60) Provisional application No. 63/466,139, filed on May 12, 2023.

(51) Int. Cl.
*H04B 1/3877* (2015.01)
*H04M 1/04* (2006.01)

(52) U.S. Cl.
CPC ............ *H04B 1/3877* (2013.01); *H04M 1/04* (2013.01); *H04M 2201/08* (2013.01)

(58) Field of Classification Search
CPC .... H04B 1/3877; H04M 1/04; H04M 2201/08
See application file for complete search history.

(56) References Cited

U.S. PATENT DOCUMENTS

| | | | | |
|---|---|---|---|---|
| 5,396,556 A * | 3/1995 | Chen | B60R 11/0241 379/426 |
| 6,227,505 B1 * | 5/2001 | Van Order | B60R 11/02 379/454 |
| 8,579,172 B2 * | 11/2013 | Monaco | H04M 1/15 224/191 |
| 8,950,720 B1 * | 2/2015 | Carr | F16M 11/38 248/460 |
| 9,300,345 B2 * | 3/2016 | Johnson | H04B 1/3888 |
| 9,709,213 B2 * | 7/2017 | Zheng | F16M 11/041 |
| 10,585,708 B1 * | 3/2020 | Wilson | H04M 1/72409 |
| D892,102 S * | 8/2020 | Kim | D14/250 |
| 11,415,308 B1 * | 8/2022 | Haney | A47H 23/00 |
| 11,726,824 B2 * | 8/2023 | Wilson | G06F 9/5027 709/205 |
| 12,069,197 B2 * | 8/2024 | Liu | F16M 11/041 |
| 12,156,572 B1 * | 12/2024 | Kim | A44B 11/06 |
| 12,169,422 B2 * | 12/2024 | Kim | G06F 1/1652 |
| 2012/0074006 A1 * | 3/2012 | Monaco | H04M 1/15 206/320 |
| 2013/0227763 A1 * | 9/2013 | Rendon | A41D 27/08 2/244 |
| 2016/0215936 A1 * | 7/2016 | Jiang | F21K 9/272 |
| 2017/0114948 A1 * | 4/2017 | Zheng | F16M 11/40 |
| 2018/0233176 A1 * | 8/2018 | Chiu | G06F 1/187 |
| 2019/0175104 A1 * | 6/2019 | Malik | A61B 5/145 |
| 2019/0242562 A1 * | 8/2019 | Chien | F21S 6/003 |
| 2021/0258462 A1 * | 8/2021 | Goldburt | G03B 17/561 |
| 2022/0083382 A1 * | 3/2022 | Wilson | H04M 1/72454 |
| 2023/0020938 A1 * | 1/2023 | Liu | F16M 11/041 |
| 2023/0046013 A1 * | 2/2023 | Lane | A45F 5/02 |

(Continued)

*Primary Examiner* — Hai V Nguyen
(74) *Attorney, Agent, or Firm* — Justin Lampel

(57) ABSTRACT

A device for securing a phone is provided. The phone securing device has a front and a back surface wherein a portion of the back surface is secured to, for example, a phone and wherein a gap is created between a second portion of the back surface and the phone and wherein a second object, such as a computer, may be secured within the gap.

14 Claims, 11 Drawing Sheets

(56) References Cited

U.S. PATENT DOCUMENTS

| | | | | |
|---|---|---|---|---|
| 2023/0079485 | A1* | 3/2023 | Kim | G06F 1/1615 345/156 |
| 2023/0296211 | A1* | 9/2023 | Jiang | F21K 9/27 362/217.01 |

* cited by examiner

DEVICE FOR SECURING A PHONE

REFERENCE TO RELATED APPLICATIONS

This application claims priority to U.S. Provisional Application No. 63/466,139 titled "DEVICE FOR SECURING A PHONE" which was filed on May 12, 2023, the entire contents of which are incorporated by reference herein.

BACKGROUND OF THE INVENTION

A device for securing a phone is provided. The phone securing device has a front and a back surface wherein a portion of the back surface is secured to, for example, a phone and wherein a gap is created between a second portion of the back surface and the phone and wherein a second object, such as a computer, may be secured within the gap.

Devices for securing phones are known. For example, U.S. Pat. No. 5,396,556 to Chen discloses a cellular phone securing device having a fixing unit and a flexible tube, a linkage rod and a phone securing mount. The fixing unit is provided with a horizontal slide board, and a vertical contact member and a pair of bolts. The slide board and the contact member are one way adjustably limited in place and the bolts are selectively attached to the underside Of the fixing unit. In mounting of the securing device, the slide board and the contact member are adjusted to abut against a windshield of a vehicle and the bolts are in abutment with the edges of outlets of a ventilation system of the vehicle whereby the bolts and the slide board and the contact member constitute a three-point supporting of the fixing unit. The phone securing mount is adhered to a flat place of the front console board of the vehicle.

Further, U.S. Pat. No. 6,227,505 to Van Order discloses a mounting platform having a slide having a mounting shoe thereon with the slide being mounted to the platform for movement between at least first and second spaced-apart positions. In a preferred embodiment, the platform includes a guide for the slide which is spring-loaded and which slides within the guide and includes interlocking tabs and slots for positively locking the slide in at least two spaced-apart positions, thereby longitudinally moving the mounting shoe between such positions. In a preferred embodiment also, in order to provide a finished appearance to the mounting system, the slide includes a forward section which extends through an aperture formed in the platform and slides along an upper surface thereof with the body of the slide extending through the aperture into the guide such that the aperture remains enclosed by the main body or forward extension for all positions of the slide, thereby enclosing the platform.

However, these patents fail to describe a device for securing a phone which is easy to use.

SUMMARY OF THE INVENTION

A device for securing a phone is provided. The phone securing device has a front and a back surface wherein a portion of the back surface is secured to, for example, a phone and wherein a gap is created between a second portion of the back surface and the phone and wherein a second object, such as a computer, may be secured within the gap.

An advantage of the present device for securing a phone is that the present device may be used with a variety of different phones.

Another advantage of the present device for securing a phone is that the present device may be secured to a phone or to a phone case.

Yet another advantage of the present device for securing a phone is that the present device may come in a variety of different sizes and shapes.

Still another advantage of the present device for securing a phone is that the present device may have a durable interior bendable strip covered by a plastic or rubber exterior which will not damage the phone or phone case.

And another advantage of the present device for securing a phone is that the present device may have a magnet for securing the device (and therefore phone) to a metallic surface.

For a more complete understanding of the above listed features and advantages of the present device for securing a phone reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

Figure 1:
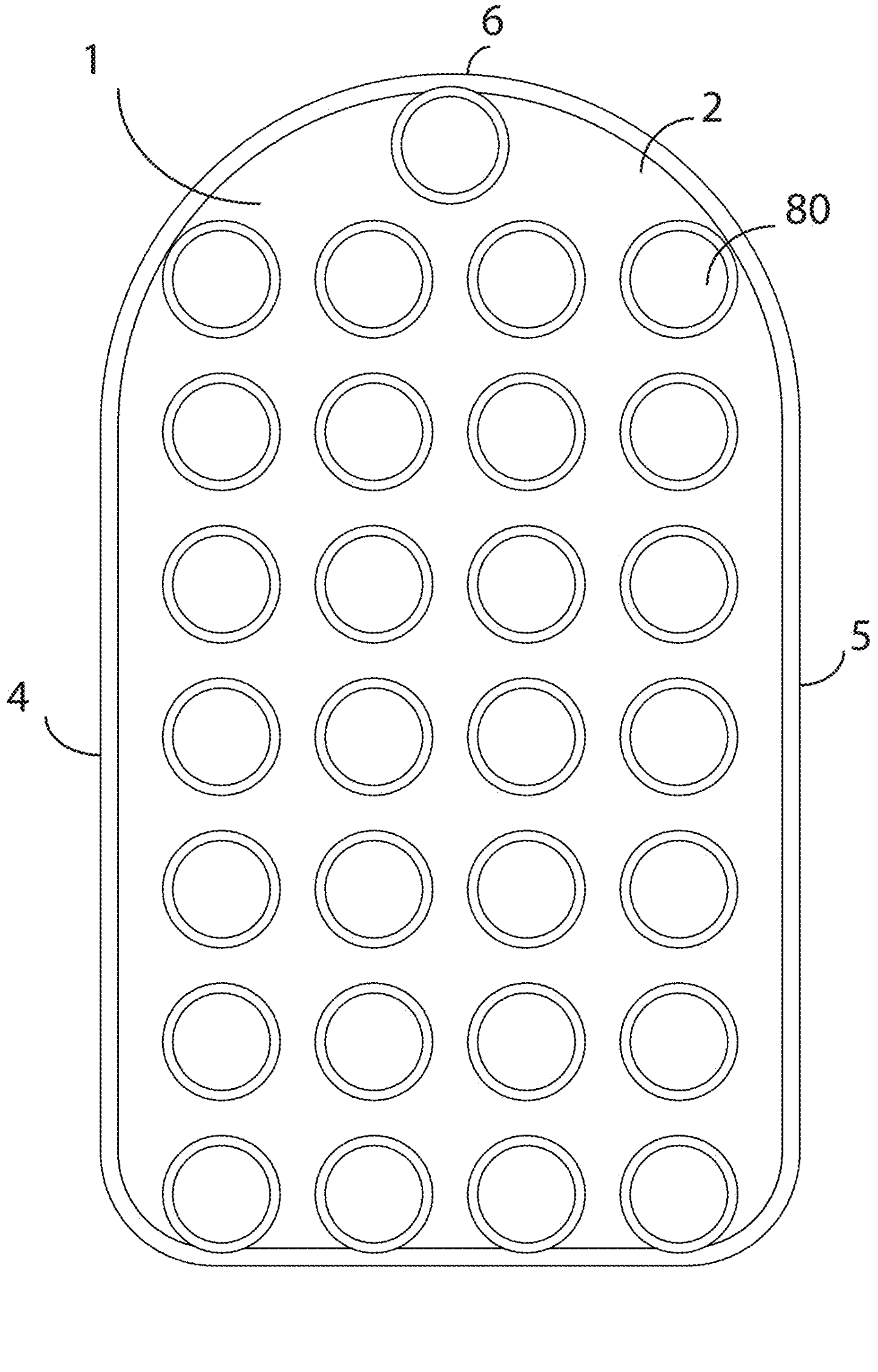
FIG. 1 illustrates a front view of the securing device for a phone.
Figure 2:
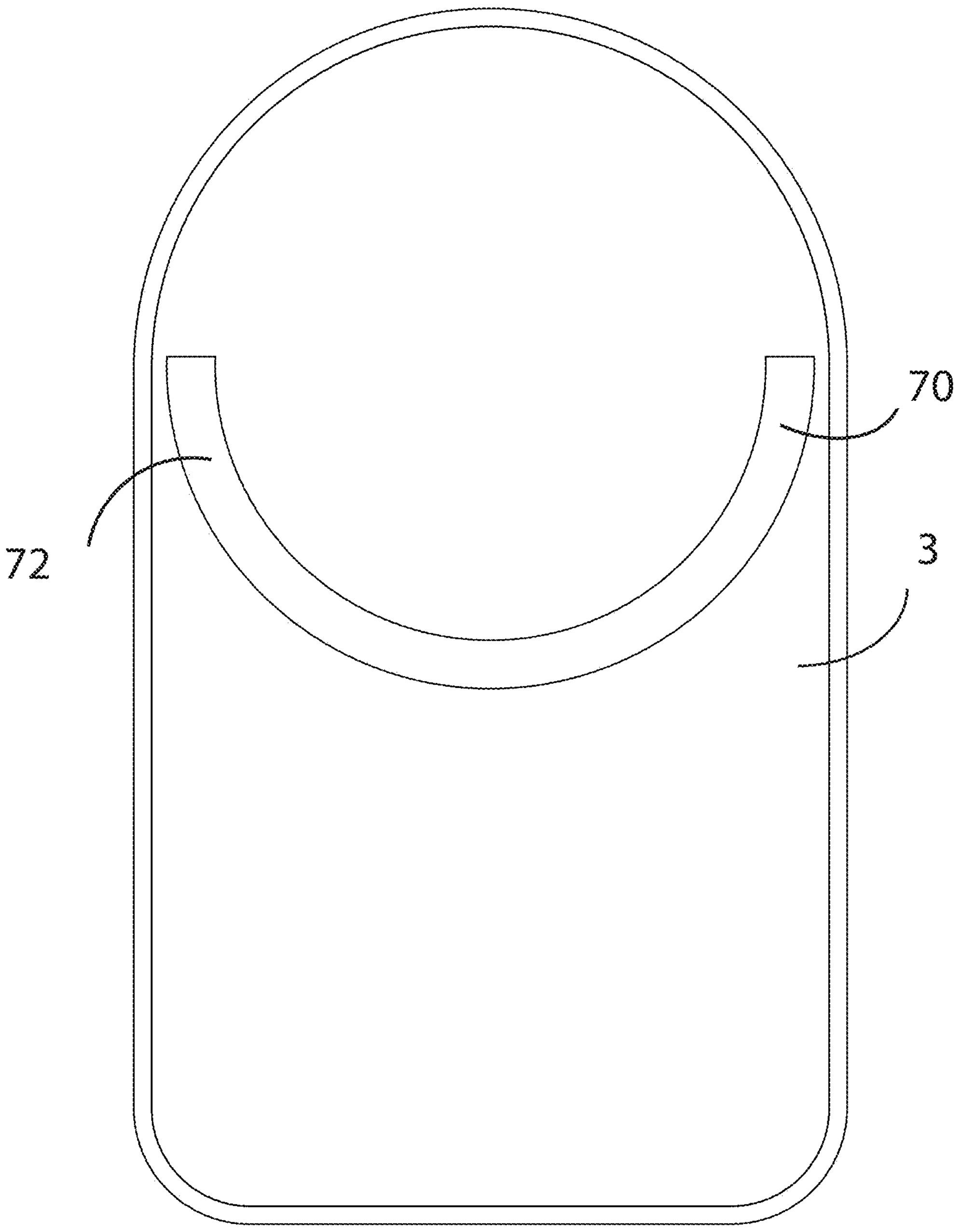
FIG. 2 illustrates a back view of the securing device for a phone.

A device for securing a phone is provided. The phone securing device has a front and a back surface wherein a portion of the back surface is secured to, for example, a phone and wherein a gap is created between a second portion of the back surface and the phone and wherein a second object, such as a computer, may be secured within the gap.

In an embodiment, a device 1 for securing a phone 10 is provided. The device 1 may have a housing having a front 2, a back 3, a first side 4, a second side 5, a top 6, a bottom 7 and an interior 8. The interior 8 of the device 1 may have a hollow section **8*a* which receives a portion of a magnet 70**

Figure 5:
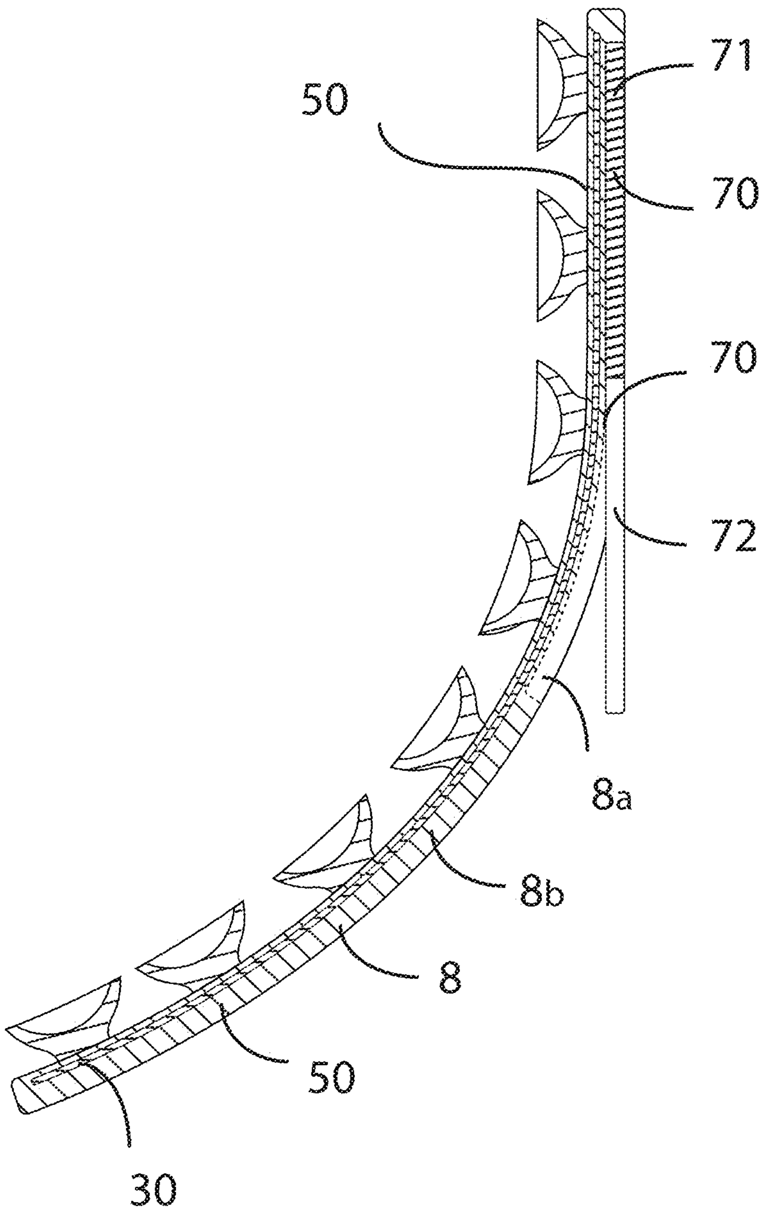
FIG. 5 illustrates a cross sectional side view of the securing device for a phone wherein the securing device is in a bent orientation.
Figure 6:
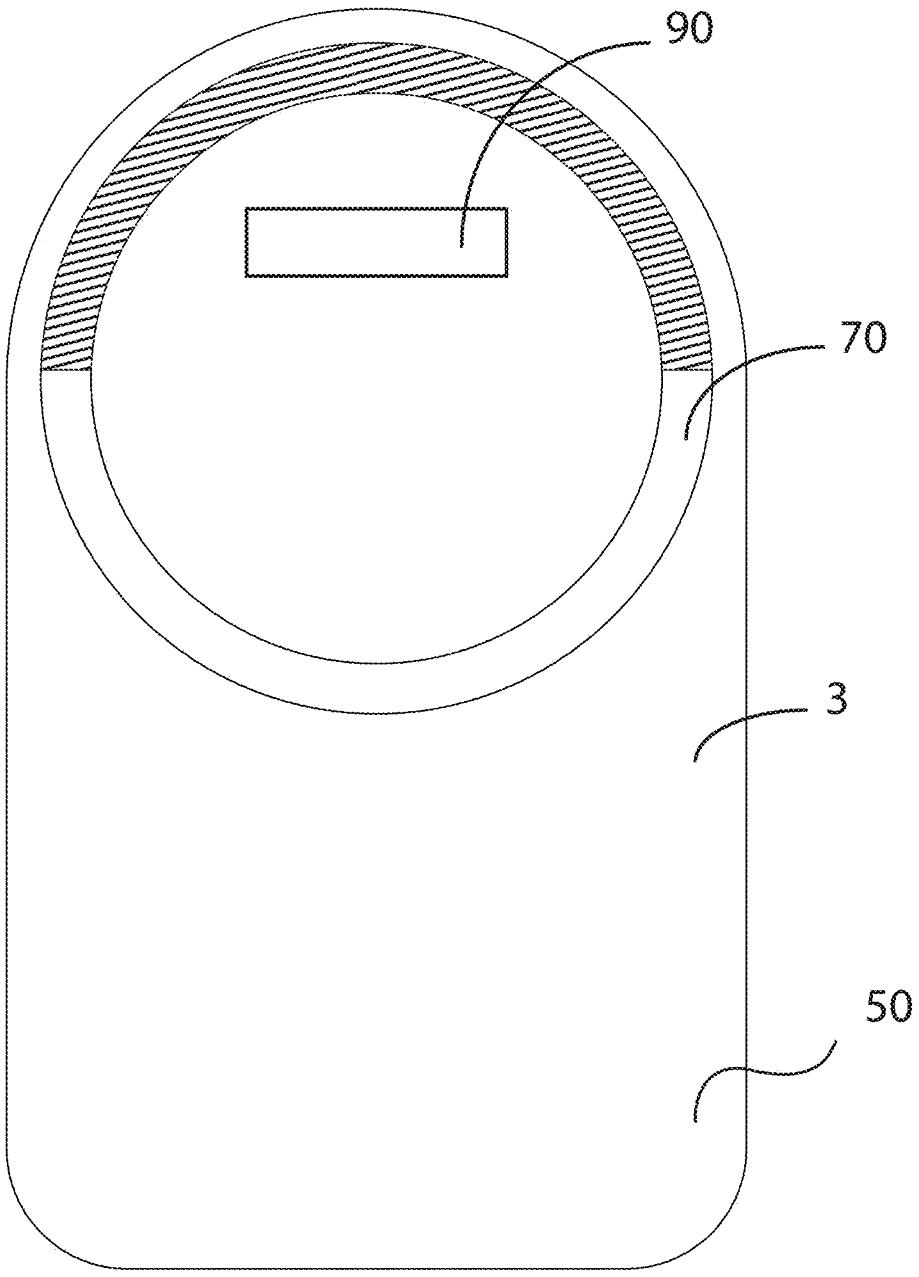
FIG. 6 illustrates a cross sectional view of the back of the securing device for a phone with a magnet incorporated into the device wherein the bottom half of the magnet is visible, but wherein the top half of the magnet is covered by the coating of the device.
Figure 7:
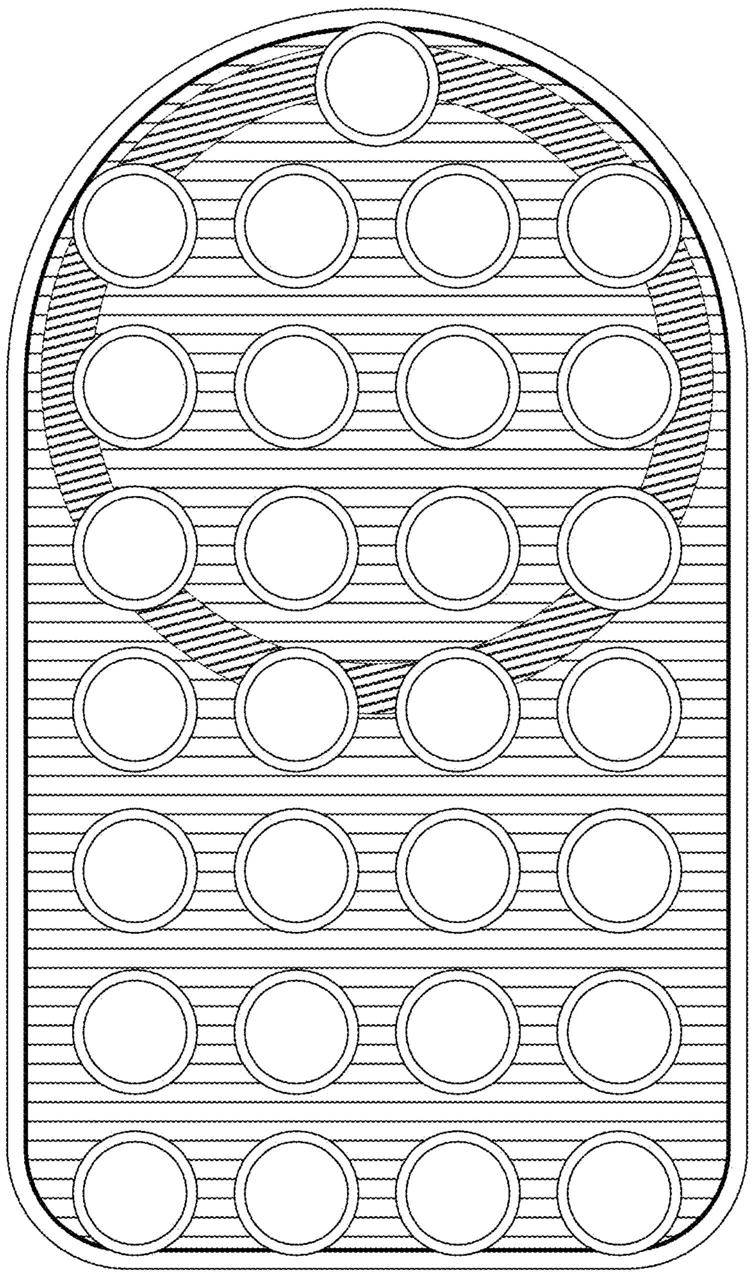
FIG. 7 illustrates a transparent front view of the securing device for a phone wherein the magnet is visible behind the securing devices of the front of the device.
Figure 10:
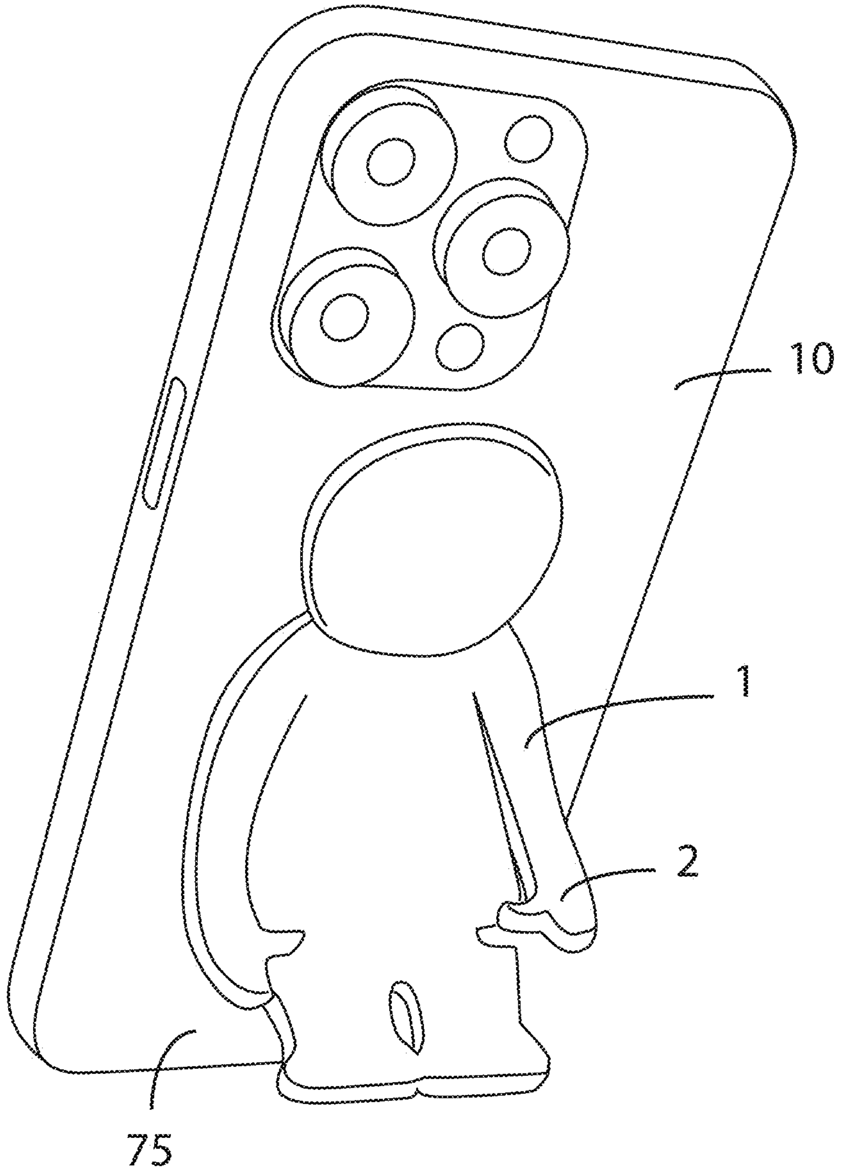
FIG. 10 illustrates the embodiment of FIG. 9 wherein the front of the securing device is bent forward and wherein the securing device is used to hold up a phone in a portrait orientation.

(as discussed below) and a solid section 8*b* which does not receive a portion of a magnet 70. The hollow section 8*a* may have a size and shape substantially equal to or identical to the size and the shape of the bottom half 72 of the magnet 70 so that the bottom half 72 of the magnet 70 may remain flush with the back 3 of the device 1 when the device 1 is in the flat orientation of FIG. 3. Further, the hollow section 8*a* opens up to the back 3 of the housing 1, therein forming an exposed opening on the back 3 when the bottom half 72 of the magnet 70 is not located in the hollow section 8*a* (when the housing 1 is bent forward as shown in FIG. 5). Although the images show the device 1 as being generally shaped like an arched door (FIG. 1) or a person (FIG. 10), the device 1 may be of any suitable size and shape depending on the desired look of the device 1.

In an embodiment, a magnet 70 may be partially permanently located within the interior 8 of the device 1. The magnet 70 may allow the device 1 to be secured to a number of metallic containing objects such as, for example, a refrigerator, computer, phone or the like. In an embodiment, the magnet 70 is preferably circular, having a top half 71 and a bottom half 72. The top half 71 of the magnet 70 may be permanently secured within a coating 50 (as discussed below) of the device 1 (and therefore within the interior of the device 1), while the bottom half 72 of the magnet 70 may not be permanently secured within the coating 50 of the device 1. In particular, the bottom half 72 of the magnet 70 may be temporarily secured within the hollow section 8*a* of the interior 8 of the device 1 when the device is in the straight orientation of FIG. 1 and the bottom half 72 of the magnet 70 may be removed from the hollow section 8*a* of the device 1 when front 2 of the device 1 is bent forward as shown in FIG. 5. As a result, depending on if the device 1 is in the straight orientation, the bottom half 72 of the magnet 70 may either be flush with the back 3 of the device 1 (FIG. 3) or may stick out from the back 3 of the device 1 (FIG. 5).

Allowing the magnet 70 to remain in a flat orientation while allowing the front 2 of the device 1 to bend forward allows the entire magnet 70 to contact and be secured to a metallic object while still allowing the front 2 of the device 1 to be stable in a bent orientation as a result of a interior bendable strip 30 as discussed below.

Located within the interior 8 of the device 1 may be, for example, the bendable strip 30. In an embodiment, the bendable strip 30 is made of a metal which retains its shape once a user bends it into the desired orientation. The bendable strip 30 is preferably durable and may support the weight of the housing 1 and an attached phone 10 in a straight or bent orientation. Completely covering the bendable strip 30 may be, for example, a non-metallic coating 50 which makes up the majority of the visible surface of the device 1. Preferably, the coating 50 is rubber or plastic so as not to scratch or otherwise damage the phone 10, computer 100 or any other object. The bendable strip 30 is preferably located between the magnet 70 and the front surface 2 of the housing so that the magnet 70 may remain in a flat orientation while the bendable strip 30 is bent.

Figure 3:
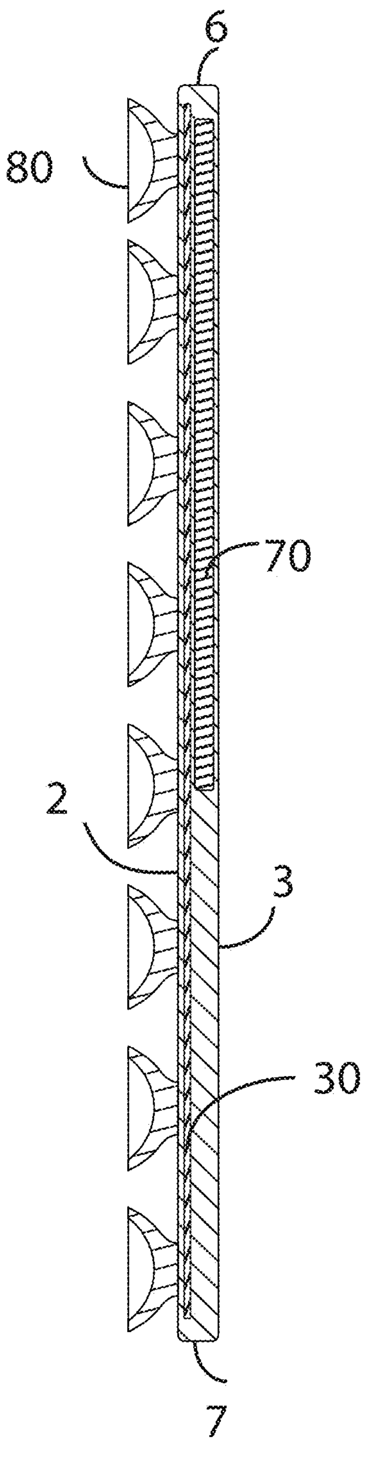
FIG. 3 illustrates a cross sectional side view of the securing device for a phone.
Figure 4:
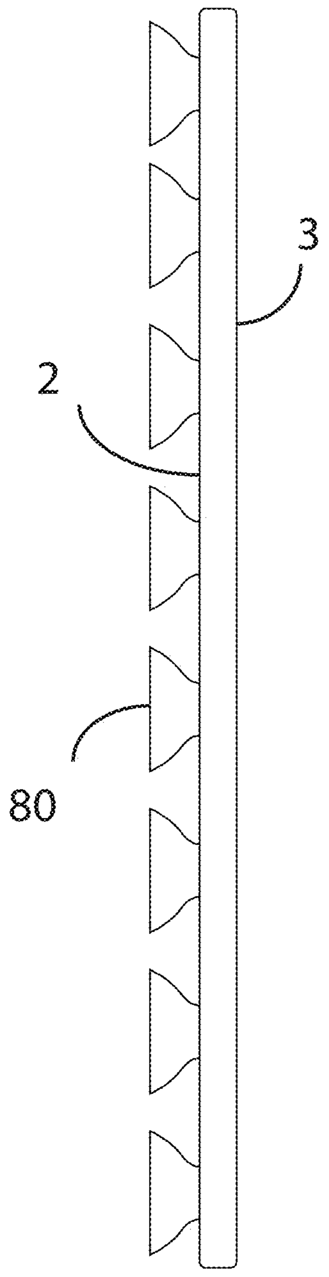
FIG. 4 illustrates a side view of the securing device for a phone.

As is illustrated in FIG. 3, the bendable strip 30 has a length (defined from the top to the bottom of the bendable strip 30) which is slightly less than the total length of the housing (defined from the top 6 to the bottom 7 of the housing). As illustrated by the cross-sectional view of FIG. 3, preferably, the bendable strip 30 has a length equal to at least ninety percent of the total length of the housing so that the device 1 remains stable when securing a phone 10. The magnet 70 has a length less than the length of the bendable strip 30. Preferably the length of the magnet 70 is between forty to sixty percent the length of the bendable strip 30 so as to best stabilize the phone 10 when the device 1 is in the bent orientation.

In an embodiment, the bendable strip 30 may be bent into various different desired orientations and may hold that desired orientation once bent. For example, the device 1 may start out in the straight orientation of FIG. 1 and may be bent, and hold its shape in, for example, the orientation of FIG. 5 or FIG. 10. In particular, user may attach the device 1 to a phone 10 via the magnet 70 and may then may pull the bottom 7 of the device 1 away from the phone 10 by bending the bendable strip 30 located within the interior 8 of the device 1 so that the device 1 maintains a bent orientation of FIG. 10 which may then be used to support the phone 10 in an upright orientation.

Figure 8:
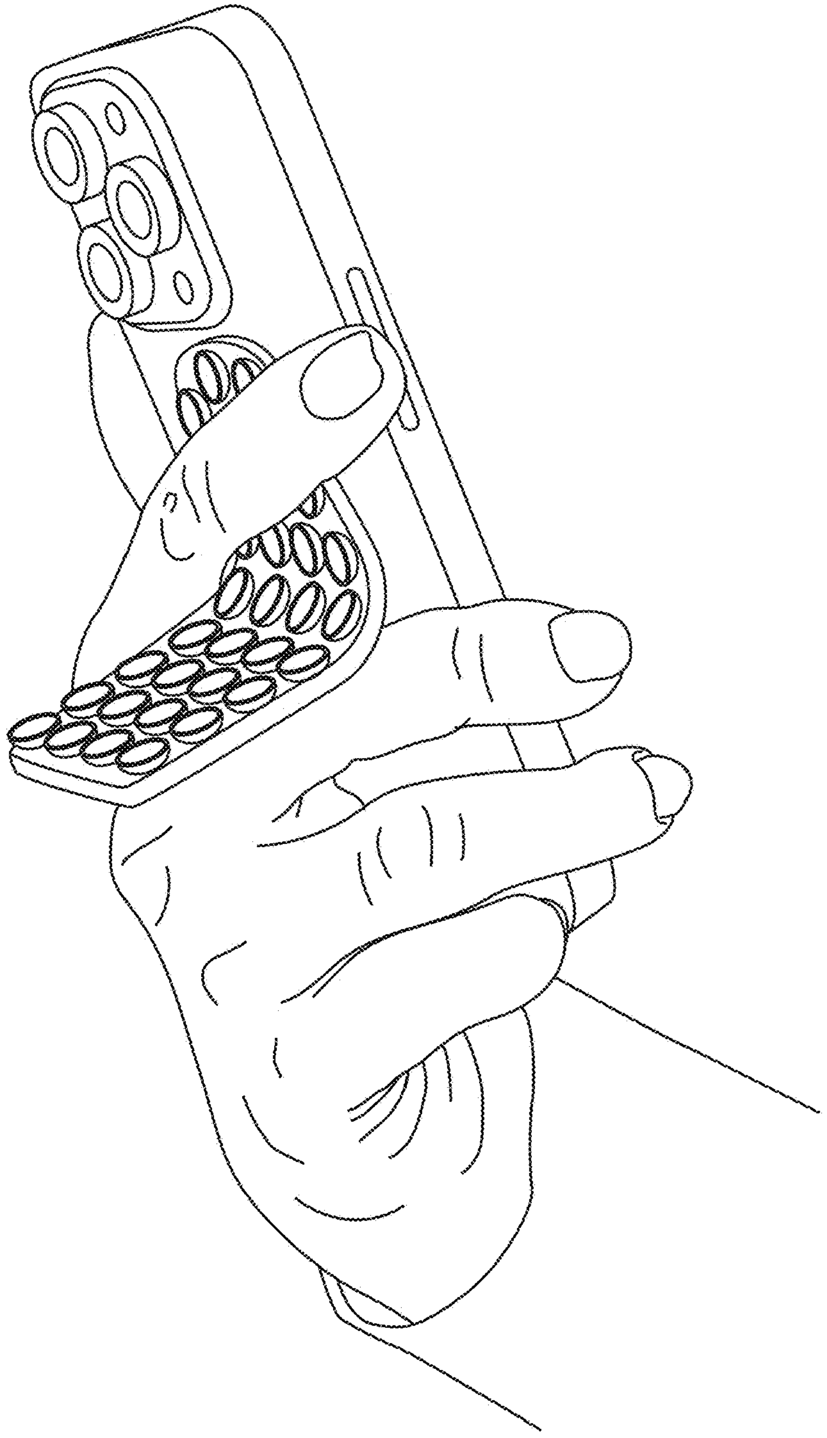
FIG. 8 illustrates the securing device secured to the back of a phone case being held by a person and wherein the bottom half of the device is bent forward.
Figure 9:
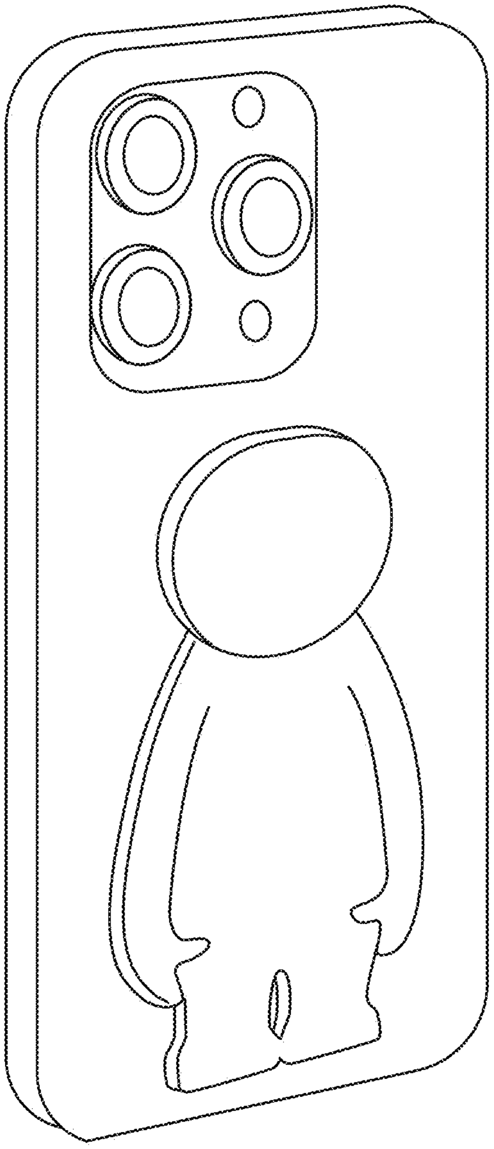
FIG. 9 illustrates an alternative shaped securing device secured to the back of a phone case wherein the device is in a straight orientation.
Figure 11:
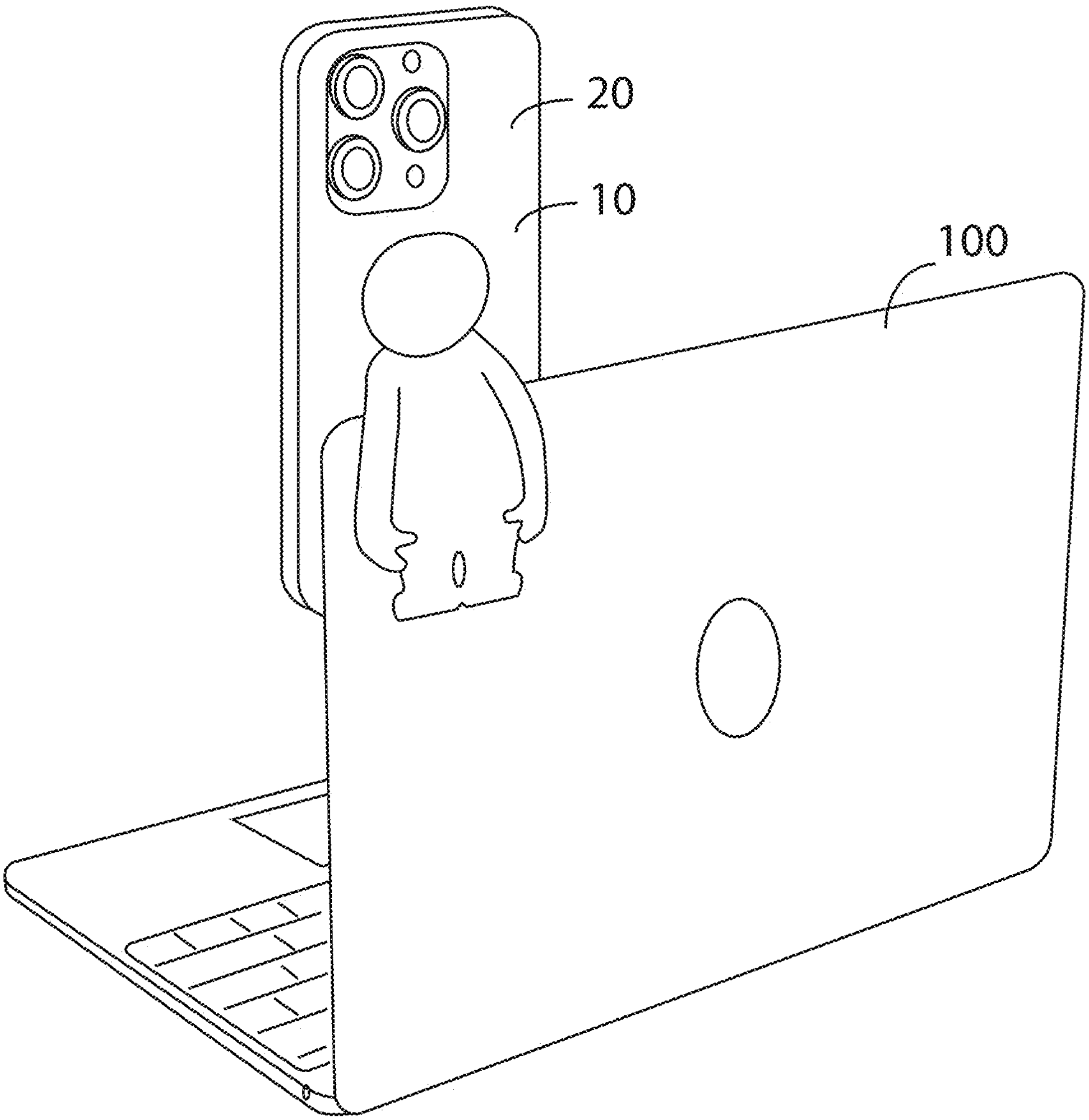
FIG. 11 illustrates the securing device secured to a phone and the phone and securing device then attached to a computer.

To secure the device 1 to, for example, a computer 100, a user may first attach the securing device 1 to the back 20 of the phone 10 (or the phone case) via the magnet 70. A user then may pull the bottom 7 of the securing device 1 outward, away from the phone 10 while keeping the top 6 portion of the securing device 1 secured to the phone 10 (as shown in FIG. 8) by bending the bendable strip 30 within the interior 8 of the device 1. A gap 75 is then created between the bottom half of the device 1 and the back 20 of the phone 10. A computer 100 (or other device) may then be slid into the gap 75 so that the computer 100 is secured between the device 1 and the phone 10 as shown in FIG. 11. The camera and or the phone aspect may be used along with the computer.

In an embodiment, the front 2 of the device may have at least one securing apparatus 80. In an embodiment, the securing apparatus 80 may be a suction cup. The images illustrate twenty-nine securing apparatuses 80 on the front 2 of the device 1; however, a greater or fewer number of securing apparatuses 80 may be used. The securing apparatuses 80 may allow the front 2 of the device 1 to be secured to a smooth flat surface. As a result, a phone 10 may be secured to the back 3 of the device 1 via the magnet 70 and the front 2 of the device 1 may be secured to, for example, a refrigerator. As a result, the device 1 may secure the phone 10 to a refrigerator.

In an alternative embodiment, the back 3 of the device 1 may have a securing adhesive 90. The adhesive (or adhesive strip) 90 may be used to attach the device 1 to the back 20 of a phone 10 or the back of a phone case.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A device for securing a phone comprising:

the device for securing a phone has a housing having a front surface, a back surface and an interior;

a bendable strip located within the interior of the housing wherein the bendable strip is capable of maintaining its position once bent;

a magnet at least partially located within the interior of the housing; and wherein the phone is temporarily and removably secured to the front surface or the back surface of the housing and wherein the interior of the housing is dimensioned and arranged so as to not receive a phone within the interior.

2. The device for securing a phone of claim 1 further comprising:

at least one securing apparatus located on the front surface of the housing.

3. The device for securing a phone of claim 2 wherein the securing apparatus is a suction cup.

4. The device for securing a phone of claim 1 wherein the bendable strip is made of metal.

5. The device for securing a phone of claim 1 further comprising:

a hollow section located within the interior of the housing wherein the hollow section partially receives a portion of the magnet when the housing is in a first position and wherein the hollow section does not receive a portion of the magnet when the housing is in a second position.

6. The device for securing a phone of claim 5 wherein the hollow section of the housing has a size and shape identical to a size and shape of a bottom portion of the magnet so that the bottom portion of the magnet is capable of being temporarily and removably located within the hollow section of the housing.

7. The device for securing a phone of claim 1 further comprising:

an adhesive strip located on the back surface of the housing.

8. The device for securing a phone of claim 1 further comprising:

a rubber or plastic coating covering the bendable strip.

9. The device for securing a phone of claim 1 wherein the magnet remains in a flat orientation while the housing is bent.

10. The device for securing a phone of claim 1 wherein the magnet has a top half and a bottom half and wherein the top half of the magnet is permanently located within the interior of the housing and wherein the bottom half of the magnet is located within the interior of the housing when the housing is in a first position and wherein the bottom half of the magnet is located outside of the housing when the housing is in a second position.

11. The device for securing a phone of claim 1 wherein the bendable strip is located between the magnet and the front surface of the housing.

12. The device for securing a phone of claim 1 wherein the magnet has a length and wherein the bendable strip has a length and wherein the length of the bendable strip is greater than the length of the magnet.

13. The device for securing a phone of claim 12 wherein the length of the bendable strip is at least ninety percent of a length of the housing.

14. A device for securing a phone comprising:

the device for securing a phone has a housing having a front surface, a back surface and an interior;

a bendable strip located within the interior of the housing;

a magnet at least partially located within the interior of the housing;

wherein the phone is temporarily and removably secured to the front surface or the back surface of the housing and wherein the interior of the housing is dimensioned and arranged so as to not receive a phone within the interior; and wherein the magnet has a top half and a bottom half and wherein the top half of the magnet is permanently located within the interior of the housing and wherein the bottom half of the magnet is located within the interior of the housing when the housing is in a first position and wherein the bottom half of the magnet is located outside of the housing when the housing is in a second position.

* * * * *